June 3, 1941.　　　　　L. MARTIN　　　　　2,244,369
ELECTRICAL MEASURING AND CALCULATING DEVICE
Filed Oct. 31, 1938　　　2 Sheets-Sheet 1
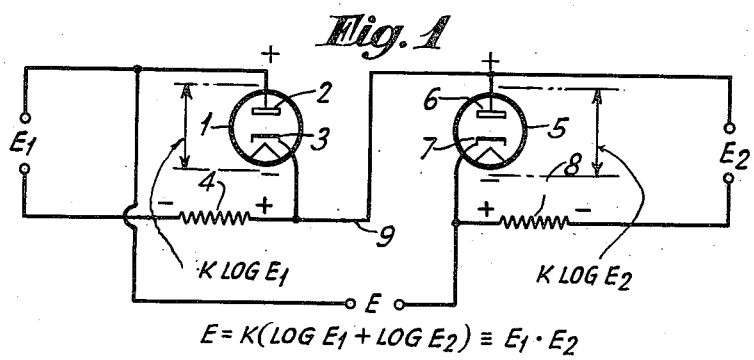
$$E = K(LOG\ E_1 + LOG\ E_2) \equiv E_1 \cdot E_2$$
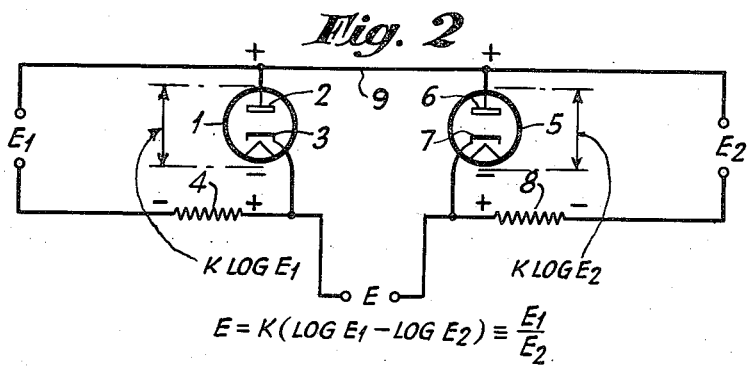
$$E = K(LOG\ E_1 - LOG\ E_2) \equiv \frac{E_1}{E_2}$$
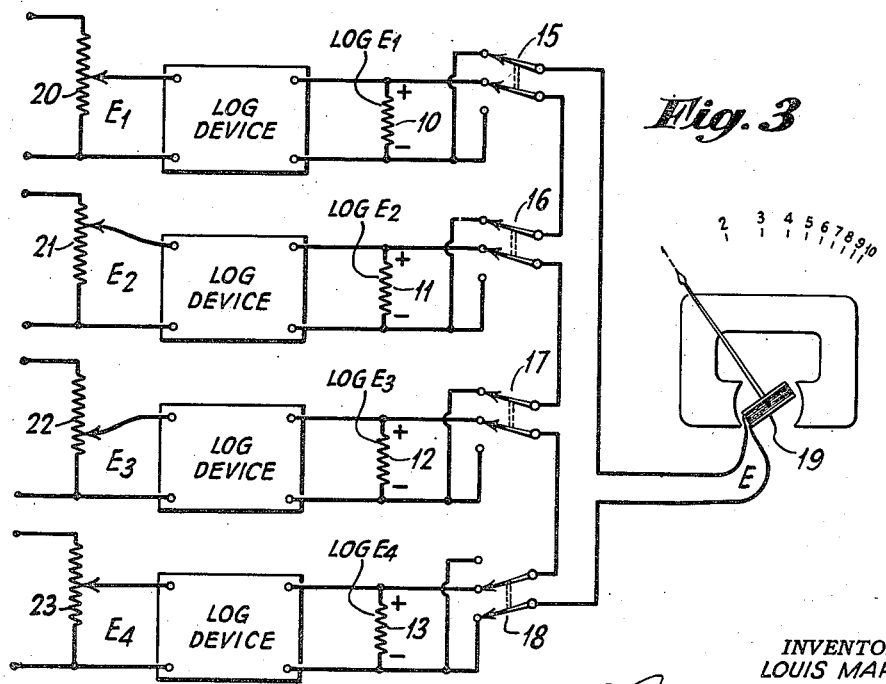
INVENTOR.
LOUIS MARTIN
BY Charles McClain
ATTORNEY.

June 3, 1941.   L. MARTIN   2,244,369
ELECTRICAL MEASURING AND CALCULATING DEVICE
Filed Oct. 31, 1938    2 Sheets-Sheet 2

INVENTOR.
LOUIS MARTIN
BY Charles McClair
ATTORNEY.

Patented June 3, 1941

2,244,369

UNITED STATES PATENT OFFICE 2,244,369

ELECTRICAL MEASURING AND CALCULATING DEVICE

Louis Martin, Haddon Heights, N. J., assignor, by mesne assignments, to Radio Corporation of America, New York, N. Y., a corporation of Delaware Application October 31, 1938, Serial No. 238,117

1 Claim. (Cl. 171—95)

My invention relates to electrical measuring and calculating devices, particularly to means for measuring the quotient or product of a plurality of electrical quanta.

The result of adding or subtracting currents may be indicated directly by passing the currents through a common resistor and reading the resulting potential difference between the ends of the resistor. To measure the ratio or product of two currents, however, their value must be separately determined as with separate meters or separate readings and the quotient or product calculated. Heretofore, no convenient means was known for directly indicating the result of multiplying or dividing several electrical quanta.

An object of my invention is an electrical measuring and calculating device for indicating directly the quotient or product of two or more electrical quanta.

My invention is defined with particularity in the appended claim and preferred embodiments are described in the following specification and shown in the accompany drawings in which—

Figure 4:
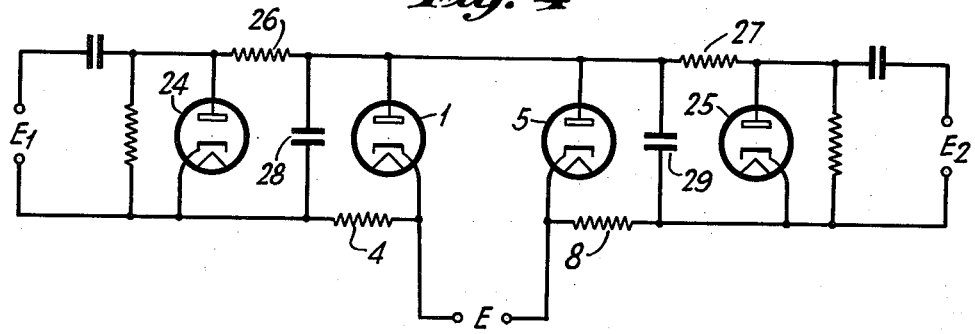
Figure 5:
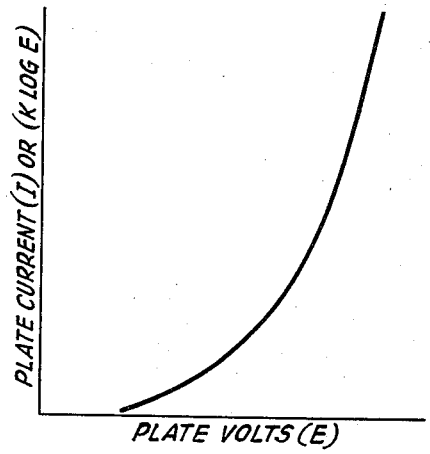

Figure 1 shows diagrammatically means for determining the product of two voltages, Figure 2 shows diagrammatically means for determining the ratio of two voltages, Figure 3 shows diagrammatically means for indicating on a scale a plurality of voltages to be multiplied and divided in any desired manner, Figure 4 shows diagrammatically means for measuring the ratio of two alternating voltages, and Figure 5 is a curve showing the mathematical relation between the input and output voltages of an electron discharge device such as a radio tube used in my improved calculating device.

The electron current to an electrode in radio tubes is an exponential function of the applied voltage when this electrode produces a retarding field at the cathode. As shown in the graphic representation in Fig. 5 of the relation between the current (I) to the electrode and the voltage (E) applied to the electrode, the curved or exponential region of the curve is:

$$I = I_0 n^{bE}$$

where $I_0$ is the value of current to the electrode when plate is shorted to cathode, E is the applied voltage, $b$ is the slope of the curve on a semilog graph, and $n$ is the base of the Naperian system of logarithms. If, then, a voltage $E_1$ is impressed across such an electron discharge device 1, through a high resistance 4, Fig. 1, with anode 2 and cathode 3 in series with resistance 4, the voltage across tube 1, due to the application of $E_1$ is proportional to log $E_1$ and equals K log $E_1$, where K is a constant determined by the physical parameters of the circuit, the geometry of the tube, and the temperature of the cathode. A second voltage $E_2$ impressed upon an identical tube 5 with anode 6 and cathode 7 in series with tube 5 produces a voltage across resistor 8 equal to K log $E_2$. By connecting these two tubes in series with conductor 9, so that their two voltages are additive, the potential E across the two tubes is equal to $$K (\log E_1 + \log E_2) = K \log (E_1 E_2)$$

Thus, the sum of these two logarithmic values is proportional to the logarithm of the product of the two values $E_1$ and $E_2$. By impressing voltage E upon a logarithmically calibrated conventional indicating meter, such as a voltmeter with a needle carried on a rotating coil between the poles of a permanent magnet, the needle deflection will be proportional to log $E_1 E_2$ and the meter reading will be $E_1 \times E_2$.

The quotient of $E_1$ divided by $E_2$ may be obtained by reversing the polarity of one of the tubes so that the measured voltage E is the difference between the two potentials across the tubes 1 and 5. In Fig. 2 the polarity of tube 5 is shown reversed and the voltage E across the two tubes in series is then equal to K (log $E_1$ — log $E_2$), which is proportional to $$\log \frac{E_1}{E_2}$$

The quotient $$\frac{E_1}{E_2}$$

may be read on a linear scale by means of an indicating device such as the logarithmically calibrated meter described in the preceding paragraph.

To multiply and divide several numbers corresponding to voltages, $E_1$, $E_2$, $E_3$, $E_4$, etc., having the same relative values as the numbers, each are impressed upon a separate device such as a vacuum tube which has logarithmic characteristics, and thus produces, as shown in Fig. 3, a plurality of voltages across resistors 10, 11, 12, 13, etc., proportional to log $E_1$, log $E_2$, log $E_3$, log $E_4$, respectively. Resistors 10, 11, 12 and 13 may be connected in series through double pole double throw switches 15, 16, 17 and 18 and connected to the winding 19 of a permanent magnet type of meter. The addition or subtraction of the voltage across each resistor in the series circuit through the meter is determined by one of the two positions of each of the switches; thus, the quanta entering the calculation may be multiplied or divided merely by a throw of switches. Assume the value of $E_1$ times $E_2$ times $E_3$ divided by $E_4$ is to be determined. The poles of switches 15, 16, and 17 would be moved to the upper pair of switch contacts and the poles of switch 18 would be moved to its lower pair of contacts. The voltage impressed upon the winding 19 of the meter would then be proportional to the log $E_1$+log $E_2$+log $E_3$—log $E_4$ which produces a reading proportional to $$\frac{E_1 \cdot E_2 \cdot E_3}{E_4}$$

By calibrating potentiometers 20, 21, 22 and 23 so that any value of voltage $E_1$, $E_2$, $E_3$ or $E_4$ corresponding to given numbers may be obtained by a numbered dial or by push buttons, the result of multiplication and division of these numbers in any desired order may be instantaneously indicated upon the meter scale. To obtain multiples of the marked scale on the indicating instrument and increase the range of the instrument, an amplifier may be connected to the input of the meter and provided with means to adjust the amplifier gain.

My improved calculating and indicating device finds many practical applications. In alternating current watt meters for example actual power in a power line may be directly indicated by multiplying three voltages proportional, respectively, to current, voltage, and power factor of the current in the line. To obtain the percentage distortion of an amplifier, a voltage proportional to the distortion may be divided by a voltage proportional to the wave fundamental. Again, the resistive component of a transmission line may be obtained by dividing the voltage across the line by the current in the line and multiplying by the power factor of the current. In the operation of conventional radio transmitters, it is desirable that the relation of four voltages be instantaneously readable. A voltage $E_1$ proportional to the carrier voltage, $E_2$ proportional to the upper side band (carrier plus signal), $E_3$ proportional to the lower side band (carrier minus signal), and $E_4$ proportional to the signal voltage may be derived with filters and each applied to a log device as in Fig. 3. Percentage modulation, or signal to carrier ratio, or the upper to lower side band ratio may be observed.

Should alternating currents be measured, it is preferred that their voltages $E_1$ and $E_2$, Fig. 4, be first rectified as in diode rectifiers 24 and 25 respectively and the ripple component of the voltages be removed by filter elements such as resistance 26 and 27 and condensers 28 and 29. The direct current component then passes through resistors 4 and 8 producing, respectively, two voltages $K \log E_1$ and $K \log E_2$. Voltage E in the device of Fig. 4 is proportional and may directly indicate the product or ratio of the two alternating-current voltages $E_1$ and $E_2$.

My improved electrical measuring and calculating device directly indicates the quotient or product of two or more electrical quanta. It has many applications in commerce and is easy and inexpensive to make, simple to operate, is direct reading and instantaneous in its indication. For example, the amplification or gain in an amplifier is usually expressed in decibels, and may be indicated directly by impressing the input voltage, $E_1$, of the amplifier on the terminals of the circuit of Fig. 4 and the output voltage $E_2$ on the other terminals. A direct reading voltmeter of conventional design connected at E indicates the ratio of the input and output voltages or the gain of the amplifier. The dial of the meter may conveniently be calibrated in terms of decibels (db.) on a linear scale.

The voltage drop across any diode connected in series with a resistor of high ohmic value may be made proportional to the logarithm of the input voltage. Any electron discharge device such as a radio tube including a cathode and another electrode which may collect electrons from the cathode, such as the anode of a diode or the anode or grid electrodes of a triode, tetrode or pentode, has the necessary variable resistance and may be used. It is preferred, however, that conventional diodes such as those commercially known as the "6H6" be connected in series with a loading resistor of about 5 megohms. The valves of the filter circuit element of Figure 4 of course depend on the frequency of the alternating current used; for commercial power frequency, resistance 26 may be several thousand ohms and condenser 28 several microfarads.

Many modifications may be made in my improved measuring and calculating device without departing from the spirit of this invention. It is accordingly desired that my invention be limited only by the prior art and the terms of the appended claim. It is understood of course that terms such as "addition" as used throughout this specification and claim means algebraic addition, including both arithmetic addition and subtraction, and that means to indicate "product" of numbers may be means to multiply the numbers, whether one or more multiplicand may be reciprocals of the numbers for purposes of division.

I claim:

An electrical calculating device comprising an electron discharge device having a cathode and an anode in an envelope, a first resistor, said device and resistor being connected in series and to the terminals of a voltage source, a second electron discharge device having a cathode and an anode in an envelope, a second resistor, said second device and said second resistor being connected in series and to the terminals of a second voltage source, each resistor having a resistance of relatively high ohmic value so that the voltage across each device is an exponential function of the voltage of its connected source, and a logarithmic indicating meter, said indicating meter and the two electron discharge devices being connected in series.

LOUIS MARTIN.